(12) United States Patent
Darrow, Jr. et al.

(10) Patent No.: US 9,957,040 B2
(45) Date of Patent: May 1, 2018

(54) PROPELLER GEARBOX OIL COOLER FOR A ROTARY WING AIRCRACT

(71) Applicant: Sikorsky Aircraft Corporation, Stratford, CT (US)

(72) Inventors: David A. Darrow, Jr., Stratford, CT (US); Thomas L. Tully, Oxford, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 131 days.

(21) Appl. No.: 14/915,156

(22) PCT Filed: Jun. 24, 2014

(86) PCT No.: PCT/US2014/043753
§ 371 (c)(1),
(2) Date: Feb. 26, 2016

(87) PCT Pub. No.: WO2015/047496
PCT Pub. Date: Apr. 2, 2015

(65) Prior Publication Data
US 2016/0207618 A1    Jul. 21, 2016

Related U.S. Application Data

(60) Provisional application No. 61/871,110, filed on Aug. 28, 2013.

(51) Int. Cl.
*B64C 27/14*    (2006.01)
*B64C 27/10*    (2006.01)
(Continued)

(52) U.S. Cl.
CPC .............. *B64C 27/14* (2013.01); *B64C 27/10* (2013.01); *B64C 27/82* (2013.01); *F16H 57/0416* (2013.01); *B64C 2027/8236* (2013.01)

(58) Field of Classification Search
CPC . B64C 2027/8236; B64C 27/10; B64C 27/14; B64C 27/82
See application file for complete search history.

(56) References Cited

U.S. PATENT DOCUMENTS 2,445,313 A    7/1948    Cosmetto
5,987,877 A  * 11/1999  Steiner .................. B64D 33/10
                                                         60/39.08
(Continued)

FOREIGN PATENT DOCUMENTS

EP    2413483 A1    2/2012
GB    2430013 A     3/2007

OTHER PUBLICATIONS

ISR/WO, dated Mar. 13, 2015.
"Propeller Hamilton Standard 14RF-19", downloaded from https://sites.google.com/site/sf340com/propeller on Oct. 25, 2013, pp. 1-6.
Amarnath Hegne, "Design and Power Transmission of Advanced Light Helicopter", International Journal of Engineering Research and Applications (IJERA), ISSN: 2248-9622, vol. 3, Issue 4, Jul.-Aug. 2013, pp. 219-223.
(Continued)

*Primary Examiner* — Justin M Benedik
(74) *Attorney, Agent, or Firm* — Cantor Colburn LLP

(57) ABSTRACT

A propeller system includes a propeller located at a tail section and a drive shaft operably connected to the propeller to drive the propeller about a propeller axis. A propeller gearbox connects the propeller to the drive shaft and a propeller gearbox lubricant cooler is operably connected to the propeller gearbox and disposed circumferentially about the drive shaft. The propeller gearbox lubricant cooler transfers thermal energy from a flow of lubricant flowing therethrough to a flow of air flowing through the tail section across the propeller gearbox lubricant cooler. A method of cooling a gearbox for a propeller includes circulating a volume of lubricant through a propeller gearbox and flowing the lubricant into a propeller gearbox cooler. Thermal energy is transferred from the lubricant to a flow of air flowing across the propeller gearbox cooler and the flow of air is vented from the tail section of the rotorcraft.

13 Claims, 2 Drawing Sheets

(51) Int. Cl.
*B64C 27/82* (2006.01)
*F16H 57/04* (2010.01)

(56) References Cited

U.S. PATENT DOCUMENTS

| | | | | |
|---|---|---|---|---|
| 2005/0229602 | A1* | 10/2005 | Whiting | F02C 7/14 |
| | | | | 60/772 |
| 2007/0063098 | A1* | 3/2007 | Dionne | B64D 33/08 |
| | | | | 244/57 |
| 2007/0095969 | A1* | 5/2007 | Walliser | B64C 3/385 |
| | | | | 244/7 A |
| 2008/0169379 | A1* | 7/2008 | Cotton | B64C 11/38 |
| | | | | 244/60 |
| 2013/0126669 | A1* | 5/2013 | Hamann | B64C 27/12 |
| | | | | 244/60 |
| 2013/0180403 | A1* | 7/2013 | Norem | F16N 39/002 |
| | | | | 95/261 |

OTHER PUBLICATIONS

Extended European Search Report for International Appln. No. 14847413.3-1754/3038904; dated Apr. 6, 2017; 8 pages.
Finckaviation.com, "Seciton 7 Transmission Systems", downloaded from http://www.finckaviation.com/files/Section_7_-_Transmission.pdf on Oct. 25, 2013, Section 7, pp. 1-30.
International Preliminary Report on Patentability for International Appln. No. PCT/US2014-043753; International Filing Date: Jun. 24, 2014; dated Mar. 1, 2016, pp. 1-8.
Johan Wiig, "Optimization of Fault Daignosis in Helicopter Health and Usage Monitoring Systems", Information Sciences Laboratories, Dec. 2006, pp. 1-158.
Saab 340B, "Aircraft Operations Manual", CT7-9B Power Plant Highlights, downloaded from www.smartcockpit.com/download.php?path=docs/&file=Saab...pdf, on Oct. 25, 2013, pp. 1-69.

* cited by examiner

# PROPELLER GEARBOX OIL COOLER FOR A ROTARY WING AIRCRACT

CROSS-REFERENCE TO RELATED APPLICATIONS

This application claims the benefit of U.S. provisional patent application Ser. No. 61/871,110 filed Aug. 28, 2013, the entire contents of which are incorporated herein by reference.

FEDERAL RESEARCH STATEMENT

This invention was made with Government support under Technology Investment Agreement W911W6-13-2-003 with the United States Army. The Government has certain rights in the invention.

BACKGROUND

The subject matter disclosed herein generally relates to propulsion systems for aircraft use. More specifically, the subject disclosure relates to cooling of gearbox components for propulsor systems of rotary wing aircraft.

A rotary wing aircraft with a coaxial contra-rotating rotor system is capable of higher speeds as compared to conventional single rotor helicopters due in part to the balance of lift between advancing sides of the main rotor blades on the upper and lower rotor systems. To still further increase airspeed, supplemental translational thrust is provided by a translational thrust system including an integrated propulsor unit with a propulsor (e.g., a propeller) oriented substantially horizontal and parallel to the aircraft longitudinal axis to provide thrust for high speed flight. Such a rotary wing aircraft may be referred to as a hybrid helicopter.

In such hybrid helicopters, the propulsor is driven by a propulsor shaft coupled to the helicopter engine along with the coaxial contra-rotating rotor system. The shaft output speed of the engine is particularly high, to enable high speed rotation of the rotor system, while such high rotational speed is often not necessary or desired for the propulsor, so the propulsor is coupled to the propulsor shaft via propulsor gearbox for reduction of propulsor rotational speed. The propulsor gearbox in turn requires cooling for its lubrication system, and this cooling system should be drag efficient for the aircraft, by not significantly increasing the cross-sectional area while meeting cooling performance requirements.

BRIEF SUMMARY

In one embodiment, a propeller system for a rotary-winged aircraft includes a propeller located at a tail section of a rotary-winged aircraft and a drive shaft operably connected to the propeller to drive the propeller about a propeller axis. A propeller gearbox connects the propeller to the drive shaft and a propeller gearbox lubricant cooler is operably connected to the propeller gearbox and disposed circumferentially about the drive shaft. The propeller gearbox lubricant cooler transfers thermal energy from a flow of lubricant flowing therethrough to a flow of air flowing through the tail section across the propeller gearbox lubricant cooler.

Alternatively or additionally, in this or other embodiments a fan is located in the tail section to urge the flow of air across the propeller gearbox lubricant cooler.

Alternatively or additionally, in this or other embodiments the fan is driven by the drive shaft.

Alternatively or additionally, in this or other embodiments the fan is coaxial with the drive shaft.

Alternatively or additionally, in this or other embodiments the flow of air is exhausted through one or more vent openings at the tail section.

Alternatively or additionally, in this or other embodiments the one or more vent openings are located between the tail section and a propeller hub.

Alternatively or additionally, in this or other embodiments the propeller gearbox lubricant cooler is disposed at the tail section.

In another embodiment, a rotorcraft includes an airframe, a drive system located at the airframe, the drive system including a drive shaft rotating about a shaft axis. A rotor assembly is operably connected to the drive system and a propeller system is positioned at a tail section of the airframe. The propeller system includes a propeller located at the tail section, a propeller gearbox located at the tail section to connect the propeller to the drive shaft, and a propeller gearbox lubricant cooler operably connected to the propeller gearbox and positioned circumferentially about the drive shaft. The propeller gearbox lubricant cooler transfers thermal energy from a flow of lubricant flowing therethrough to a flow of air flowing through the tail section across the propeller gearbox lubricant cooler.

Alternatively or additionally, in this or other embodiments a fan is located in the tail section to urge the flow of air across the propeller gearbox lubricant cooler.

Alternatively or additionally, in this or other embodiments the fan is driven by the drive shaft.

Alternatively or additionally, in this or other embodiments the fan is coaxial with the drive shaft.

Alternatively or additionally, in this or other embodiments the flow of air is exhausted through one or more vent openings at the tail section.

Alternatively or additionally, in this or other embodiments the one or more vent openings are positioned between the tail section and a propeller hub.

Alternatively or additionally, in this or other embodiments the propeller gearbox lubricant cooler is located at the tail section.

In yet another embodiment, a method of cooling a gearbox for a propeller of a rotor craft includes circulating a volume of lubricant through a propeller gearbox disposed at a tail section of a rotorcraft and flowing the lubricant into a propeller gearbox cooler. Thermal energy is transferred from the lubricant to a flow of air flowing across the propeller gearbox cooler and the flow of air is vented from the tail section of the rotorcraft.

Alternatively or additionally, in this or other embodiments the flow of air is urged across the propeller gearbox cooler via a fan located at the tail section.

Alternatively or additionally, in this or other embodiments the fan is driven via rotation of a propeller drive shaft.

Alternatively or additionally, in this or other embodiments the flow of air is vented from one or more vent openings between the tail section and a propeller hub.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION

Figure 1:
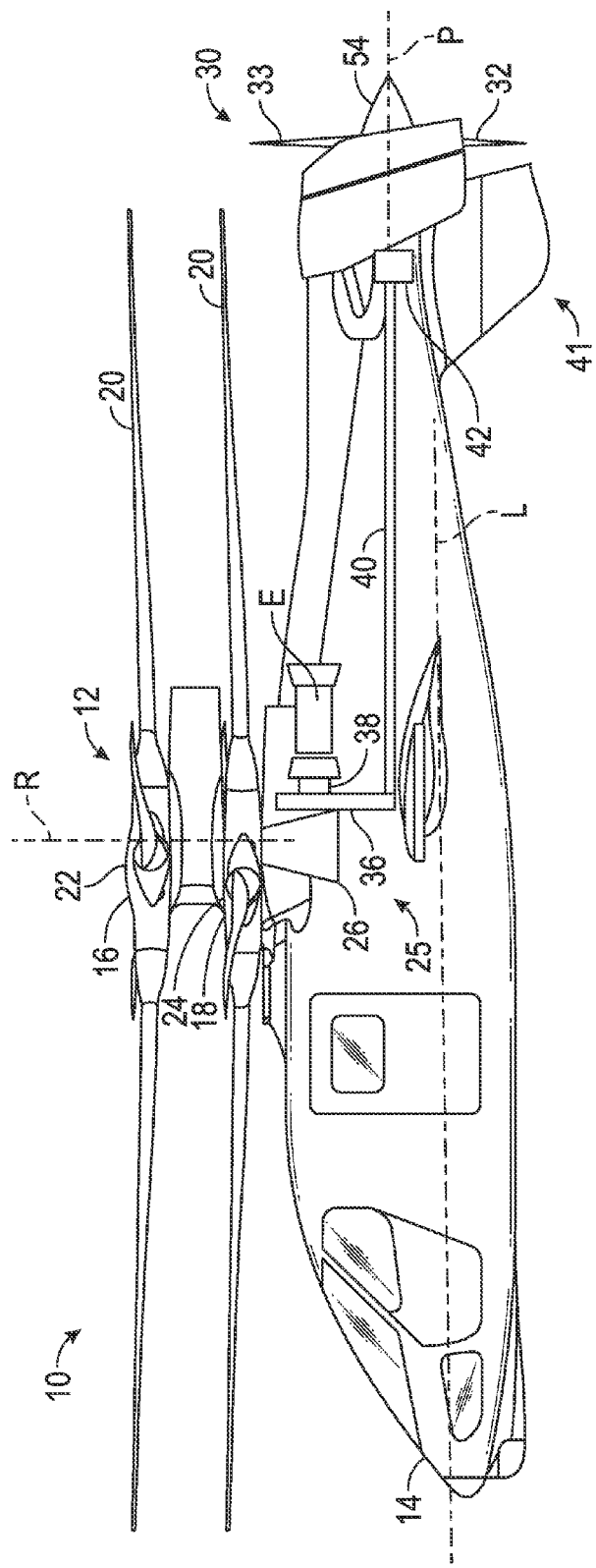
FIG. 1 is a general side view of an exemplary rotary wing aircraft for use in accordance with embodiments.

FIG. 1 illustrates an exemplary vertical takeoff and landing (VTOL) high speed compound or coaxial contra-rotating rigid rotor aircraft 10 having a dual, contra-rotating main rotor system 12, which rotates about a rotor axis of rotation R. The aircraft 10 includes an airframe 14 which supports the dual, contra-rotating, coaxial main rotor system 12 as well as a translational thrust system 30 which provides translational thrust generally parallel to an aircraft longitudinal axis L.

The main rotor system 12 includes an upper rotor system 16 and a lower rotor system 18 as dual contra-rotating main rotors in a coaxial configuration. A plurality of rotor blade assemblies 20 are mounted to a rotor hub 22, 24 of each rotor system 16, 18, respectively. The main rotor system 12 is driven by a transmission 25. The translational thrust system 30 may be any propeller system including, but not limited to a pusher propeller, a tractor propeller, a nacelle mounted propeller, etc. In the example of FIG. 1, the translational thrust system 30 includes an auxiliary propulsor 32. In an embodiment, the auxiliary propulsor 32 is a pusher propeller system with a propeller rotational axis P oriented substantially horizontal and parallel to the aircraft longitudinal axis L to provide thrust for high speed flight. The translational thrust system 30 may be driven through a main gearbox 26 which also drives the main rotor system 12.

The transmission 25 includes the main gearbox 26 driven by one or more engines, illustrated schematically at E. The main gearbox 26 and engines E are considered as part of the non-rotating frame of the aircraft 10. In the case of a rotary wing aircraft, the main gearbox 26 may be interposed between one or more gas turbine engines E, the main rotor system 12 and the translational thrust system 30. In one embodiment, the main gearbox 26 is a split torque gearbox which carries torque from the engines E through a multitude of drivetrain paths. Although a particular rotary wing aircraft configuration is illustrated and described in the disclosed non-limiting embodiment, other configurations and/or machines with rotor systems are within the scope of the present invention.

The transmission 25 may also include a combiner gearbox 36 in meshing engagement with the main gearbox 26 and driven by one or more engines E. The engines E may drive the combiner gearbox 36 and the main gearbox 26 through a disconnecting mechanism, such as an overrunning clutch 38. The translational thrust system 30 can include a drive shaft 40 which is driven by the combiner gearbox 36 to drive the auxiliary propulsor 32 through an auxiliary propulsor gearbox 42. It should be understood that although the combiner gearbox 36 is schematically illustrated as a separate component, the combiner gearbox 36 may alternatively be incorporated directly into the main gearbox 26. In the example of FIG. 1, the propulsor 32 includes a plurality of propeller blades 33 extending from a propeller hub 54 and is positioned at a tail section 41 of the aircraft 10. The propulsor gearbox 42 is likewise located at the tail section 41, in some embodiments to achieve a desired Cg of the aircraft 10.

Figure 2:
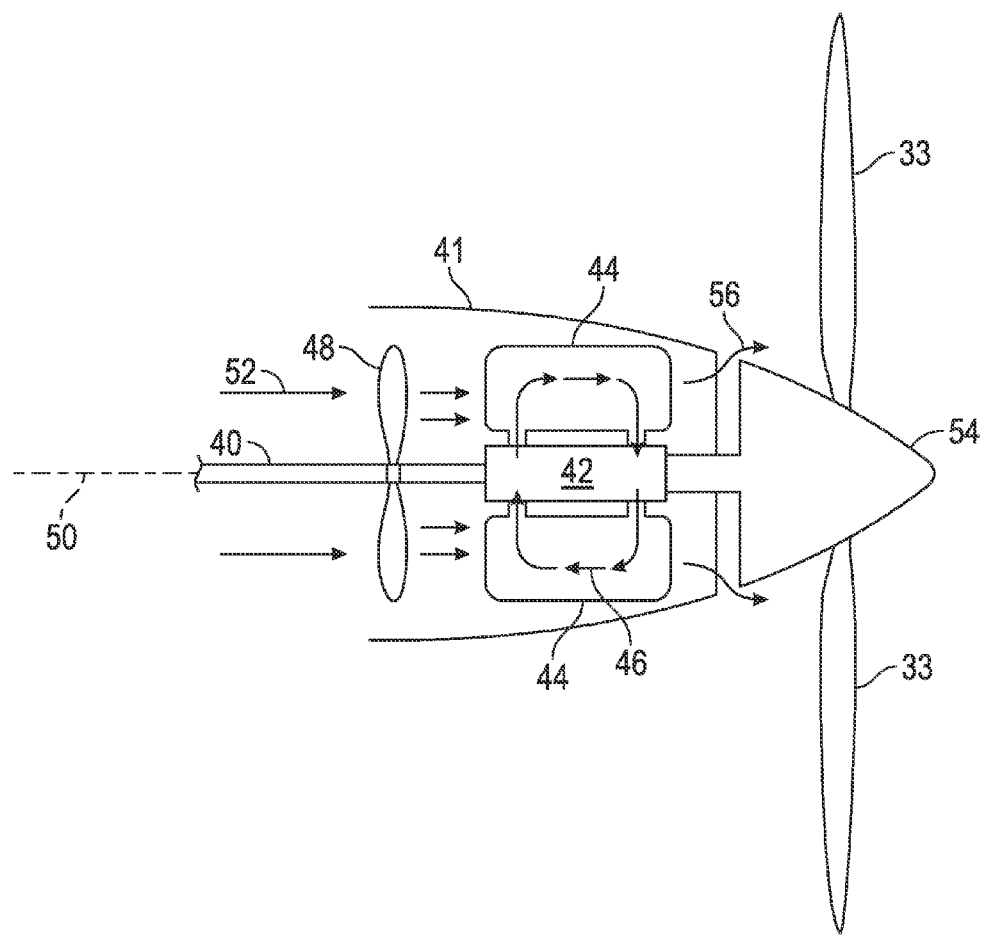
FIG. 2 is a cross-sectional view of an embodiment of a tail section of a rotary wing aircraft.

Referring now to FIG. 2, the propulsor gearbox 42 is fluid lubricated and cooled with, for example, oil serving as the lubricant. To periodically dissipate thermal energy from the lubricant to extend its service life, the propulsor gearbox (PGB) 42 includes a PGB oil cooler 44, a heat exchanger through which the lubricant is circulated. The PGB oil cooler 44 is located in an interior of the tail section 41 along with the PGB 42, and is located circumferentially around the drive shaft 40. As PGB lubricant 46 is circulated through the PGB 42, at least a portion of the PGB lubricant 46 is flowed through the PGB oil cooler 44. A cooler fan 48 is located in the tail section 41 and is, in some embodiments, located coaxial with and driven by rotation of the drive shaft 40. Rotation of the cooler fan 48 about a drive shaft axis 50 urges a flow of air 52 across the PGB oil cooler 44 to dissipate heat from the PGB lubricant 46 into the flow of air 52. In some embodiments, the source of the flow of air 52 is bypass air flowed through the one or more engines E.

After passing over the PGB oil cooler 44, the flow of air 52 is exhausted out of the rear of the tail section 41. In particular, the flow if air 52 is vented between the tail section 41 and the propeller hub 54, at one or more vent openings 56 between the tail section 41 and the propeller hub 54 being axial and/or radial relative to the drive shaft 50.

The PGB 42 and PGB oil cooler 44 configurations disclosed herein achieve control of the propulsor 32 rotational speed and cooling of the PGB 42 lubricant without increasing drag or adding significant complexity to the aircraft 10. The existing drive shaft 50 is utilized to drive the cooler fan 48, while the venting of the flow of air 52 is via the preexisting vent opening 56, not an additional vent or port added to the tail section 41 structure.

While the invention has been described in detail in connection with only a limited number of embodiments, it should be readily understood that the invention is not limited to such disclosed embodiments. For instance, while described in terms of aircraft, it is understood that aspects could be used in other contexts such as for wind turbines, maritime propulsion, or other technologies in which a rotating element's plan of rotation will vary from perpendicular with the axis of rotation of a shaft driving the rotating element. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A propeller system for a rotary-winged aircraft comprising:
   a propeller located at a tail section of the rotary-winged aircraft;
   a drive shaft operably connected to the propeller to drive the propeller about a propeller axis;
   a propeller gearbox to connect the propeller to the drive shaft;
   a propeller gearbox lubricant cooler operably connected to the propeller gearbox and disposed circumferentially about the drive shaft, the propeller gearbox lubricant cooler transferring thermal energy from a flow of lubricant flowing there through to a flow of air flowing through the tail section across the propeller gearbox lubricant cooler; and a fan disposed in the tail section to urge the flow of air across the propeller gearbox lubricant cooler, the fan being arranged coaxial with the drive shaft.

2. The propeller system of claim 1, wherein the fan is driven by the drive shaft.

3. The propeller system of claim 1, wherein the flow of air is exhausted through one or more vent openings at the tail section.

4. The propeller system of claim 3, wherein the one or more vent openings are disposed between the tail section and a propeller hub.

5. The propeller system of claim 1, wherein the propeller gearbox lubricant cooler is disposed at the tail section.

6. A method of cooling a gearbox for a propeller of a rotor craft comprising:

circulating a volume of lubricant through a propeller gearbox disposed at a tail section of the rotorcraft;

flowing the lubricant into a propeller gearbox cooler;

transferring thermal energy from the lubricant to a flow of air flowing across the propeller gearbox cooler;

urging the flow of air across the propeller gearbox cooler via a fan disposed at the tail section and mounted coaxially with a drive shaft operably connected to the propeller to drive the propeller about a propeller axis; and venting the flow of air from the tail section of the rotorcraft.

7. The method of claim 6, further comprising driving the fan via rotation of a propeller drive shaft.

8. The method of claim 6, further comprising venting the flow of air from one or more vent openings between the tail section and a propeller hub.

9. A rotorcraft comprising:

an airframe;

a drive system disposed at the airframe, the drive system including a drive shaft rotating about a shaft axis; and a rotor assembly operably connected to the drive system; and a propeller system disposed at a tail section of the airframe including:

a propeller disposed at the tail section;

a propeller gearbox disposed at the tail section to connect the propeller to the drive shaft;

a propeller gearbox lubricant cooler operably connected to the propeller gearbox and disposed circumferentially about the drive shaft, the propeller gearbox lubricant cooler transferring thermal energy from a flow of lubricant flowing there through to a flow of air flowing through the tail section across the propeller gearbox lubricant cooler; and a fan disposed in the tail section to urge the flow of air across the propeller gearbox lubricant cooler, the fan being arranged coaxial with the drive shaft.

10. The rotorcraft of claim 9, wherein the fan is driven by the drive shaft.

11. The rotorcraft of claim 9, wherein the flow of air is exhausted through one or more vent openings at the tail section.

12. The rotorcraft of claim 11, wherein the one or more vent openings are disposed between the tail section and a propeller hub.

13. The rotorcraft of claim 9, wherein the propeller gearbox lubricant cooler is disposed at the tail section.

\* \* \* \* \*

UNITED STATES PATENT AND TRADEMARK OFFICE
CERTIFICATE OF CORRECTION

| | |
|---|---|
| PATENT NO. | : 9,957,040 B2 |
| APPLICATION NO. | : 14/915156 |
| DATED | : May 1, 2018 |
| INVENTOR(S) | : David A. Darrow et al. |

It is certified that error appears in the above-identified patent and that said Letters Patent is hereby corrected as shown below:

On the Title Page

In Column 1, (54), delete "PROPELLER GEARBOX OIL COOLER FOR A ROTARY WING AIRCRACT," and insert -- PROPELLER GEARBOX OIL COOLER FOR A ROTARY WING AIRCRAFT -- therefor.

Signed and Sealed this
Fifth Day of March, 2019

Andrei Iancu
*Director of the United States Patent and Trademark Office*